United States Patent
Takahashi (10) Patent No.: US 11,414,075 B2
(45) Date of Patent: Aug. 16, 2022

(54) VEHICLE DRIVING ASSISTANCE SYSTEM AND METHOD

(71) Applicant: Mazda Motor Corporation, Hiroshima (JP)

(72) Inventor: Hideki Takahashi, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 301 days.

(21) Appl. No.: 16/739,159

(22) Filed: Jan. 10, 2020

(65) Prior Publication Data
US 2020/0231150 A1  Jul. 23, 2020

(30) Foreign Application Priority Data

Jan. 17, 2019  (JP) ................ JP2019-005720

(51) Int. Cl.
*B60W 30/12* (2020.01)
*G01C 21/34* (2006.01)
*G06Q 10/04* (2012.01)
*G07C 5/00* (2006.01)

(52) U.S. Cl.
CPC .......... *B60W 30/12* (2013.01); *G01C 21/343* (2013.01); *G01C 21/3446* (2013.01); *G01C 21/3453* (2013.01); *G06Q 10/047* (2013.01); *G07C 5/008* (2013.01)

(58) Field of Classification Search
CPC ..... G05D 1/0212; B60W 10/20; B60W 30/12
See application file for complete search history.

(56) References Cited

U.S. PATENT DOCUMENTS

| | | |
|---|---|---|
| 2014/0244114 A1 | 8/2014 | Matsubara |
| 2018/0292824 A1 | 10/2018 | Kazemi et al. |
| 2019/0084561 A1* | 3/2019 | Takeda ................ G08G 1/167 |
| 2019/0257664 A1* | 8/2019 | Matsuda ............. G05D 1/0217 |
| 2021/0163010 A1* | 6/2021 | Takabayashi ......... B60W 40/02 |

FOREIGN PATENT DOCUMENTS

| | | |
|---|---|---|
| JP | 2011-128758 A | 6/2011 |
| WO | 2013/051081 A1 | 4/2013 |

OTHER PUBLICATIONS

Extended European search report dated Jun. 17, 2020, in corresponding European patent Application No. 20151597.0, 9 pages.

* cited by examiner

*Primary Examiner* — Ryan Rink
(74) *Attorney, Agent, or Firm* — Xsensus LLP (57) ABSTRACT

A system, method and computer program product provide vehicle driving assistance, wherein candidate travel routes for the vehicle are analyzed to identify one of the travel routes as a selected travel route. The selection includes calculating a route cost associated with directing the vehicle to ride over a center of a travel lane, for each of the candidate routes and selecting the one with the lowest cost.

20 Claims, 6 Drawing Sheets

VEHICLE DRIVING ASSISTANCE SYSTEM AND METHOD

CROSS REFERENCE TO RELATED APPLICATIONS

The present application contains subject matter related to Japanese Priority Application 2019-005720, filed in the Japanese Patent Office on Jan. 17, 2019, the entire contents of which being incorporated herein by reference in its entirety. The application also contains subject matter related to that described in U.S. application Ser. No. 16/739,147, and claiming priority to JP 2019-005721; U.S. application Ser. No. 16/739,154, and claiming priority to JP 2019-005722; U.S. application Ser. No. 16/739,144, and claiming priority to JP 2019-005721, the entire contents of each of which being incorporated herein by reference in their entirety.

TECHNICAL FIELD

The present disclosure relates to a vehicle driving assistance system and a vehicle driving assistance method for setting a travel route for a vehicle and assisting with driving on the basis of this travel route.

BACKGROUND ART

Conventionally, as travel route generation algorithms for a vehicle, a potential method, a spline interpolation function, an A-star (A*) method, the Dijkstra method, RRT, a state lattice method, and the like are used.

In the A-star method and the Dijkstra method, grids that are partitioned vertically and horizontally are each set as a node, and the nodes are expanded in a manner to minimize cost (route cost). In this way, a route is searched. For example, in Patent document 1, a route search system that selects a route with the minimum cost among routes from a start point to an end point included in an area represented by the grids is disclosed. In the route search system, the node with the minimum cost is expanded, more specifically, the number of expanding directions from the node with the minimum cost is set according to a moving direction, and the moving direction for the expanded node with the minimum cost is determined.

In the state lattice method, a grid area including a large number of grid points is set in a travel road, these grid points are sequentially connected to set a large number of travel route candidates, and one travel route is selected from these travel route candidates. For example, in Patent document 2, a vehicle driving assistance system is disclosed. In the vehicle driving assistance system, the plural travel routes are set on a grid map, movement cost indicative of a degree of danger in the case where a host vehicle travels is set for each cell of the grid map, and one of the travel routes is selected on the basis of this movement cost.

PRIOR ART DOCUMENTS

Patent Documents

[Patent document 1] JP-A-2011-128758
[Patent document 2] WO 2013/051081

SUMMARY

Problems to be Solved

By the way, when the travel route is set, it is preferred to appropriately set such a route that the vehicle travels at a center position on a host vehicle lane (a lane where the host vehicle travels on the travel road). In order to realize the above, it is considered to define the route cost that corresponds to the position where the vehicle travels on the travel road. However, as recognized by the present inventor, in the related art, because the variables/parameters do not account for it, it is impossible to appropriately define the route cost that allows the vehicle to travel at the center position on the host vehicle lane. Hereinafter, travel of the vehicle at the center position on the host vehicle lane will appropriately be referred to as "lane centering".

The present disclosure has been made to solve the above-described and other problems, and therefore has a purpose of providing a vehicle driving assistance system and a vehicle driving assistance method capable of appropriately defining route cost so as to set and maintain a travel route on which a vehicle travels at a center position of a host vehicle lane.

Means for Solving the Problems

In order to achieve the above-described and other purposes, the present disclosure describes a vehicle driving assistance system having a travel road information acquisition interface that acquires travel road information about a travel road on which a vehicle is located, the interface configured to obtain the travel road information from any combination of a sensor, a set of sensors, and a remote source; and a controller having circuitry configured to set a target travel route for the vehicle in the travel road based on the travel road information and to execute driving control of the vehicle so the vehicle travels along the target travel route, wherein the circuitry is configured to:
set plural travel route candidates as candidate options for setting the target travel route based on the travel road information;
set plural sampling points on each of the plural travel route candidates;
calculate route cost at each of the plural sampling points set on each of the plural travel route candidates; and
select one travel route of the plural travel route candidates as the target travel route on the basis of having a lowest route cost, and
the circuitry is further configured to:
increase a route cost at a particular sampling point as a distance between a center line of a host vehicle lane, on which the vehicle travels, in the travel road and the particular sampling point is increased, and
increase a change rate of the route cost with respect to the distance between the center line and the particular sampling point as a distance between the vehicle and the particular sampling point along the travel road is reduced.

In the present disclosure that is configured as described above, the controller increases the route cost at the sampling point as the distance between the sampling point on the set travel route candidate and the center line of the host vehicle lane in the travel road is increased. In particular, the controller increases the change rate (in other words, a change amount or a gradient of the change) of the route cost with respect to the distance between the center line and the sampling point as the distance between the vehicle and the sampling point is reduced. In this way, in an area located relatively close to the vehicle (a short-distance area), since the change rate of the route cost with respect to the distance from the center line is large, the lane centering is preferentially considered when the travel route is set, that is, an influence of the route cost related to the lane centering on route selection is increased. As a result, in the short-distance area, it is possible to appropriately select the travel route in which the lane centering is prioritized, and thus accuracy of the lane centering can be improved. Meanwhile, in an area located relatively far from the vehicle (a long-distance area), the change rate of the route cost with respect to the distance from the center line is low. Thus, it is unlikely to preferentially consider the lane centering when the travel route is set. That is, the influence of the route cost related to the lane centering on the route selection becomes insignificant. In the long-distance area, it is difficult to secure accuracy of the travel road information acquisition device (typically, a camera). Thus, estimation accuracy of a shape and the like of the travel road is degraded. Accordingly, in such a long-distance area, the change rate of the route cost with respect to the distance from the center line is reduced. In this way, the prioritization of the lane centering can appropriately be suppressed for the travel road, the estimation accuracy of the shape and the like of which is not secured. As it has been described so far, according to the present disclosure, it is possible to appropriately define the route cost such that the travel route on which the vehicle travels at a center position of the host vehicle lane is set.

In the present disclosure, under a condition that the particular sampling point being located within the host vehicle lane, the circuitry is configured to increase the change rate of the route cost with respect to the distance between the center line and the particular sampling point to be higher than for a case where the particular sampling point is located outside of the host vehicle lane. According to the present disclosure that is configured as described above, in the case where the sampling point is located within the host vehicle lane, it is possible to appropriately secure the influence of the route cost related to the lane centering on the route selection. On the other hand, in the case where the sampling point is located on the outside of the host vehicle lane, it is possible to appropriately suppress the influence of the route cost related to the lane centering on the route selection.

In the present disclosure, in the case where the sampling point is located within the host vehicle lane, the controller is preferably configured to:

increase the change rate of the route cost with respect to the distance between the center line and the particular sampling point as the distance between the vehicle and the particular sampling point along the travel road is reduced under a condition where the particular sampling point is located within the host vehicle lane; and set the same change rate of the route cost with respect to the distance between the center line and the particular sampling point regardless of the distance between the vehicle and the particular sampling point along the travel road under a condition where the sampling point is located on an outside of the host vehicle lane. Also, in the present disclosure that is configured as described above, it is possible to appropriately suppress the influence of the route cost related to the lane centering on the route selection in the case where the sampling point is located on the outside of the host vehicle lane.

In the present disclosure, the controller is preferably configured to change the change rate of the route cost with respect to the distance between the center line and the sampling point stepwise according to the distance between the vehicle and the sampling point along the travel road. In the present disclosure that is configured as described above, the controller changes the change rate of the route cost stepwise according to the distance between the vehicle and the sampling point. Thus, the several change rates of the route cost only have to be stored. As a result, there is no need to calculate the change rate of the route cost that should be applied according to the distance between the vehicle and the sampling point. Therefore, it is possible to reduce a calculation load.

In another aspect, in order to achieve the above purpose, the present disclosure is a vehicle driving assistance method that is executed by a controller including a computer, and includes: setting, with circuitry, plural travel route candidates as candidate options for setting a target travel route for a vehicle located on a travel road based on travel road information on the travel road;

setting plural sampling points on each of the plural travel route candidates;

calculating route cost at each of the plural sampling points set on each of the plural travel route candidates;

selecting one travel route of the plural travel route candidates as the target travel route on the basis of having a lowest route cost; and executing driving control of the vehicle so the vehicle travels along the target travel route, wherein the calculating the route cost, includes increasing a route cost at a particular sampling point as a distance between a center line of a host vehicle lane, on which the vehicle travels, in the travel road and the particular sampling point is increased, and increasing a change rate of the route cost with respect to the distance between the center line and the particular sampling point as a distance between the vehicle and the particular sampling point along the travel road is reduced.

Also, in the disclosure configured as described above, it is possible to appropriately define the route cost such that the travel route on which the vehicle travels at the center position of the host vehicle lane is set.

Advantages

According to the vehicle driving assistance system and the vehicle driving assistance method of the present disclosure, it is possible to appropriately define the route cost such that the travel route on which the vehicle travels at the center position of the host vehicle lane is set.

MODES FOR CARRYING OUT THE DISCLOSURE

A description will hereinafter be made on a vehicle driving assistance system and a vehicle driving assistance method according to an embodiment of the present disclosure with reference to the accompanying drawings.

[System Configuration]

Figure 1:
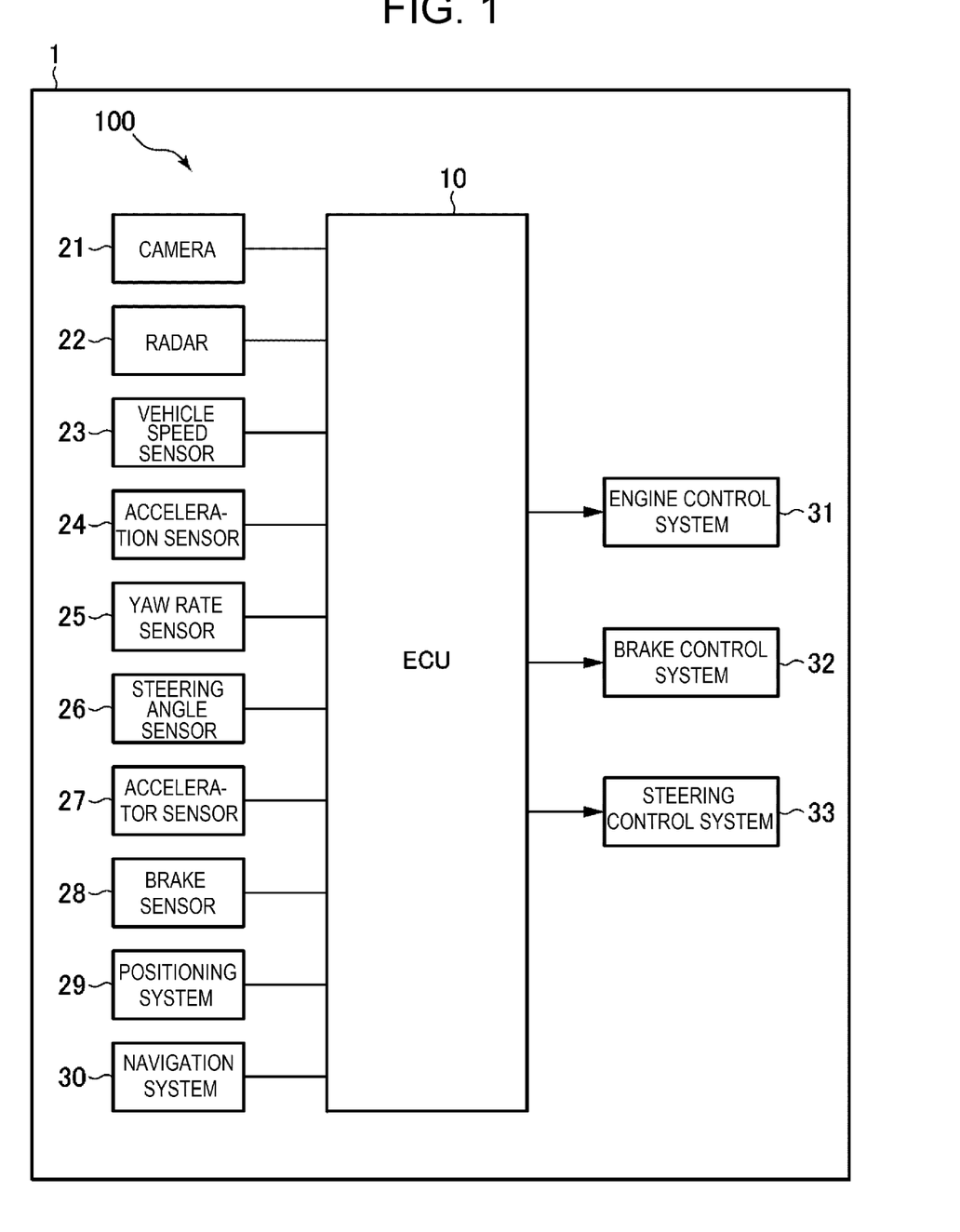
FIG. 1 is a block diagram illustrating a schematic configuration of a vehicle driving assistance system according to an embodiment of the present disclosure.

A description will firstly be made on a configuration of the vehicle driving assistance system according to the embodiment of the present disclosure with reference to FIG. 1. FIG. 1 is a block diagram illustrating a schematic configuration of the vehicle driving assistance system according to the embodiment of the present disclosure.

A vehicle driving assistance system 100 is configured to execute driving assistance control (automated driving control) for setting a target travel route for a vehicle 1 and causing the vehicle 1 to travel along this target travel route. As illustrated in FIG. 1, the vehicle driving assistance system 100 includes an electronic control unit (ECU) 10 as a vehicle controller or a controller, plural types of sensors, and plural control systems. Optionally, the ECU may include the processor 835 and other circuitry in system 800 of FIG. 6., which may be implemented as a single processor-based system, or a distributed processor based system, including remote processing, such as cloud based processing.

More specifically, the plural types of the sensors include a camera 21 (having an image sensor that takes fixed and/or moving images in the visual spectrum and/or non-visual ranges such as infrared and ultraviolet), a radar and/or Lidar 22 (short-range radars, SRR, that operate, for example, in the 20 GHz to 27 GHz range, long range radars, LRR, operating, for example, in the 76 to 81 GHz range, as well as Lidar that operates in at least one of ultraviolet, visible, and near infrared spectrums using lasers having a principle wavelength, for example, in a range of 500 nm to 1000 nm) a vehicle speed sensor 23 for detecting behavior of the vehicle 1 and a driving operation by an occupant, an acceleration sensor 24, a yaw rate sensor 25, a steering angle sensor 26, an accelerator sensor 27, and a brake sensor 28. Furthermore, the plural types of the sensors are a positioning system 29 for detecting a position of the vehicle 1 and a navigation system 30. The plural control systems are an engine control system 31, a brake control system 32, and a steering control system 33.

Moreover, other types of the sensors may be a peripheral sonar system for measuring a distance from and a position of a structure around the vehicle 1. a corner radar provided at each of four corners of the vehicle 1 to measure approach of the peripheral structure, and an inner camera for capturing an image of the inside of a vehicle cabin in the vehicle 1.

The electronic control unit (ECU) 10 executes various calculations on the basis of signals received from the plural types of the sensors, and sends control signals to the engine control system 31, the brake control system 32, and the steering control system 33 so as to appropriately actuate an engine system, a brake system, and a steering system, respectively. The ECU 10 is constructed of a computer that includes one or more processors (typically CPUs), memory for storing various programs (ROM, RAM, or the like), an input/output device, and the like. The ECU 10 corresponds to an example of the "controller" in the present disclosure.

The camera 21 captures an image around the vehicle 1, and outputs image data. Based on the image data received from the camera 21, the ECU 10 identifies objects (for example, a preceding vehicle, a parked vehicle, a pedestrian, a travel road, road marking lines (a lane divider, a white line, and a yellow line), a traffic signal, a traffic sign, a stop line, an intersection, an obstacle, and the like). The ECU 10 may acquire information on the object from the outside through a traffic infrastructure, inter-vehicle communication, or the like. In this way, a type, a relative position, a moving direction, and the like of the object are identified.

The radar 22 measures a position and a speed of the object (particularly, the preceding vehicle, the parked vehicle, the pedestrian, a dropped object on a travel road 5, or the like). For example, a millimeter-wave radar can be used as the radar 22. The radar 22 transmits a radio wave in an advancing direction of the vehicle 1, and receives a reflected wave that is generated when the object reflects the transmitted wave. Then, based on the transmitted wave and the received wave, the radar 22 measures a distance between the vehicle 1 and the object (for example, an inter-vehicular distance) and a relative speed of the object to the vehicle 1. In this embodiment, instead of the radar 22, a laser radar, an ultrasonic sensor, or the like may be used to measure the distance from the object and the relative speed of the object. Alternatively, plural types of sensors may be used to constitute a position and speed measuring device.

The camera 21 and the radar 22 correspond to an example of the "travel road information acquisition device" in the present disclosure.

The vehicle speed sensor 23 detects an absolute speed of the vehicle 1. The acceleration sensor 24 detects acceleration of the vehicle 1, including a passenger compartment of the vehicle. This acceleration includes acceleration in a longitudinal direction and acceleration in a lateral direction (that is, lateral acceleration). In this specification, the acceleration includes not only a change rate of the speed in a speed increasing direction but also a change rate of the speed in a speed reducing direction (that is, deceleration). Example acceleration sensors employ a signal processor connected to a micromechanical comb structure that forms a capacitor with a capacitance set by the spatial distances between comb teeth. When subject to acceleration, relative displacement of comb teeth creates a capacitive change, which is sensed by the signal processor. Piezoelectric, piezoresistive and micro electro-mechanical system (MEMS) sensors may be used as well.

The yaw rate sensor 25 detects a yaw rate of the vehicle 1. The steering angle sensor 26 detects a rotation angle (a steering angle) of a steering wheel of the vehicle 1. The ECU 10 executes specified calculations on the basis of the absolute speed detected by the vehicle speed sensor 23 and the steering angle detected by the steering angle sensor 26, and can thereby acquire a yaw angle of the vehicle 1 (that is, an angle defined by the longitudinal direction of the vehicle 1 with respect to an x-axis, which will be described later). The accelerator sensor 27 detects a depression amount of an accelerator pedal. The brake sensor 28 detects a depression amount of a brake pedal.

The positioning system 29 is a GPS system and/or a gyroscopic system, and detects the position of the vehicle (current vehicle position information). The navigation system 30 stores map information therein, and can provide the map information to the ECU 10. Based on the map information and the current vehicle position information, the ECU 10 identifies a road, the intersection, the traffic signal, a building, and the like existing around (particularly, in the advancing direction of) the vehicle 1. The map information may be stored in the ECU 10. The navigation system 30 also corresponds to an example of the "travel road information acquisition device" in the present disclosure.

The engine control system 31 controls an engine of the vehicle 1. The engine control system 31 is a component capable of regulating engine output (drive power) and, for example, includes an ignition plug, a fuel injection valve, a throttle valve, a variable valve mechanism that changes opening/closing timing of intake/exhaust valves, and the like. When the vehicle 1 has to be accelerated or decelerated, the ECU 10 sends the control signal to the engine control system 31 so as to change the engine output.

The brake control system 32 controls a brake system of the vehicle 1. The brake control system 32 is a component capable of regulating a braking force of the brake system and, for example, includes a hydraulic pump, a valve unit, and the like. When the vehicle 1 has to be decelerated, the ECU 10 sends the control signal to the brake control system 32 so as to generate the braking force.

The steering control system 33 controls a steering device of the vehicle 1. The steering control system 33 is a component capable of regulating the steering angle of the vehicle 1 and, for example, includes an electric motor for an electric power steering system, and the like. When the advancing direction of the vehicle 1 has to be changed, the ECU 10 sends the control signal to the steering control system 33 so as to change a steering direction.

[Basic Concept of Driving Assistance]

Figure 2:
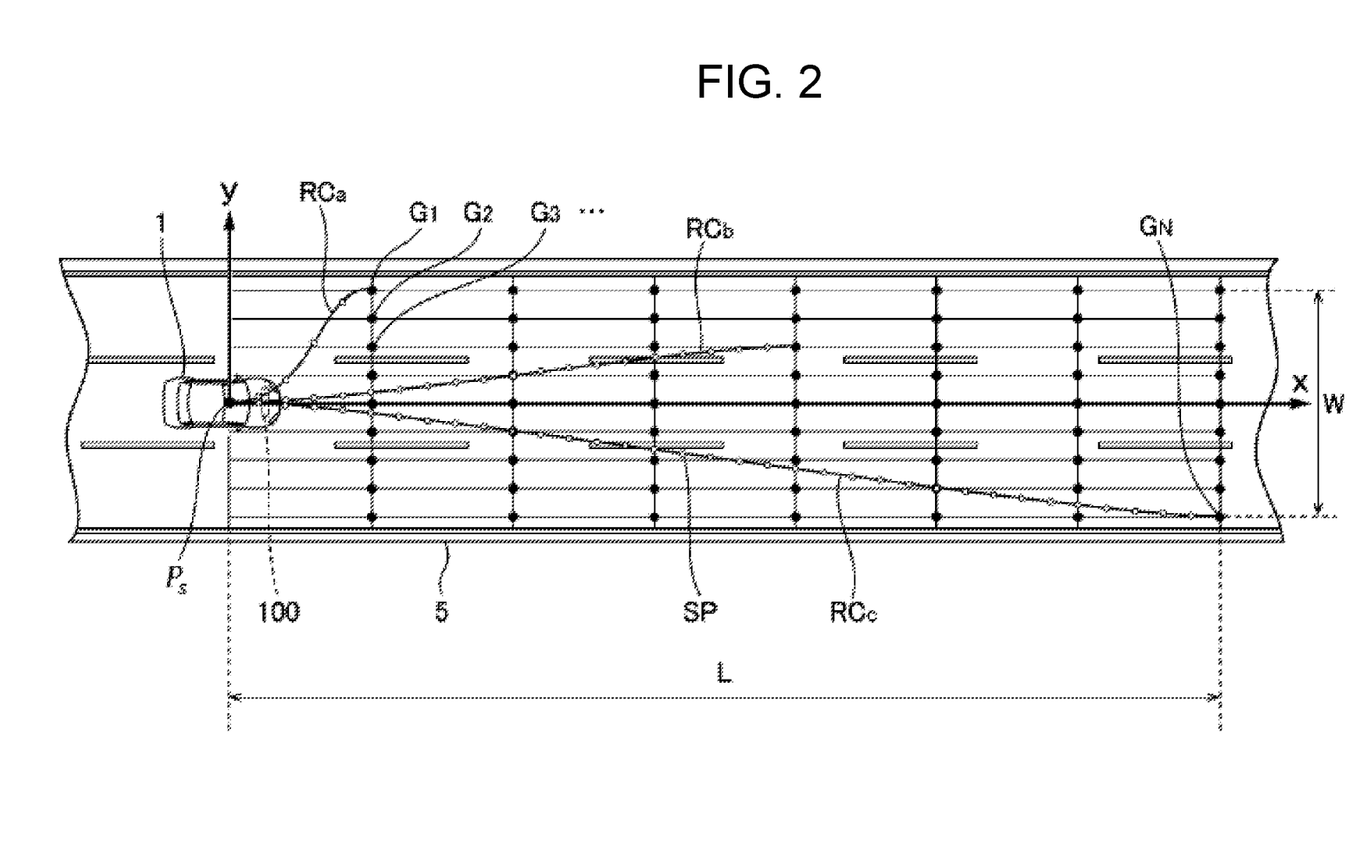
FIG. 2 is an explanatory view of basic concept of driving assistance according to the embodiment of the present disclosure.

Next, a description will be made on basic concept of driving assistance that is executed by the above-described ECU 10 in the embodiment of the present disclosure with reference to FIG. 2. FIG. 2 illustrates a situation where the vehicle 1 travels on the travel road 5.

First, the ECU 10 executes a calculation to identify the position of the vehicle 1 on the travel road 5 on the basis of travel road information. The travel road information is information on the travel road 5 where the vehicle 1 travels, and is acquired by the camera 21, the radar 22, the navigation system 30, and the like. For example, the travel road information includes information on a shape of the travel road (a straight road, a curved road, curvature of the curved road), a travel road width, the number of lanes, a lane width, and the like.

Next, the ECU 10 executes the calculation based on the travel road information, so as to set plural virtual grid points $G_n$ (n=1, 2, . . . N) on the travel road 5 existing ahead of the advancing direction of the vehicle 1. In the case where an extending direction of the travel road 5 is defined as an x-direction and a width direction of the travel road 5 is defined as a y-direction, the grid points $G_n$ are arranged in a lattice shape along the x-direction and the y-direction. An origin of x-y coordinates is set to a point corresponding to the position of the vehicle 1.

An area where the ECU 10 sets the grid points $G_n$ is stretched in front of the vehicle 1 for a distance L along the travel road 5. The distance L is calculated on the basis of the speed of the vehicle 1 at the time of the calculation. In this embodiment, the distance L is a distance for which the vehicle 1 is assumed to travel at a speed (V) during the calculation for a specified fixed time t (for example, three seconds) (L=V×t). However, the distance L may be a specified fixed distance (for example, 100 m) or a function of the speed (and the acceleration). In addition, a width W of the area where the grid points $G_n$ are set is set to a substantially equal value to a width of the travel road 5. When the plural grid points $G_n$ are set, just as described, the position of the vehicle 1 on the travel road 5 can be identified.

Here, the travel road 5 illustrated in FIG. 2 is a straight section, and thus the grid points $G_n$ are arranged in a rectangular shape. However, the grid points $G_n$ are arranged along the extending direction of the travel road. Thus, in the case where the travel road includes a curved section, the grid points $G_n$ are arranged along curvature of the curved road. The road itself may be detected via visual discontinuities between the road surface and a different surface at the edge of the road, or perhaps by painted lines, reflectors, or other visual indicators on the road surface. Similar information is used for detecting a travel lane.

Next, based on the travel road information, the ECU 10 executes a calculation to set a travel route candidate, RC, (that is, a candidate that possibly becomes the target travel route where the vehicle 1 will actually travel). More specifically, the ECU 10 sets the plural travel route candidates RC by a route search using the state lattice method. In the state lattice method, the plural travel route candidates RC are initially set from the position of the vehicle 1 and disperse relative to one another in a branched manner toward the grid points $G_n$ existing generally in the advancing direction of the vehicle 1. In FIG. 2, travel route candidates $RC_a$, $RC_b$, $RC_c$ are illustrated as some of the plural travel route candidates RC set by the ECU 10.

The ECU 10 may set the travel route candidates RC on the basis of obstacle information in addition to the travel road information. This obstacle information is information on presence or absence of the obstacle (for example, the preceding vehicle, the parked vehicle, the pedestrian, the dropped object, or the like) on the travel road 5 in the advancing direction of the vehicle 1, a moving direction thereof, a moving speed thereof, and the like, and is acquired by the camera 21 and the radar 22.

Next, as illustrated in FIG. 2, the ECU 10 sets plural sampling points SP along each of the travel route candidates RC, and calculates route cost at each of the sampling points SP. Each of these sampling points SP is a discrete point (position), which is provided on the route of each of the travel route candidates RC and at which the route cost is calculated. More specifically, for each of the plural travel route candidates RC, the ECU 10 calculates the route cost at each of the plural sampling points SP.

Next, based on the thus-calculated route cost of each of the plural travel route candidates RC, the ECU 10 selects a route with the minimum route cost from the plural travel route candidates RC, and sets such a route as the target travel route. Then, the ECU 10 sends the control signal to at least one of the engine control system 31, the brake control system 32, and the steering control system 33 such that the vehicle 1 travels along the set target travel route.

[Calculation of Route Cost]

Next, a description will be made on the route cost according to the embodiment of the present disclosure. Basically, the route cost includes a cost defined according to a combination of plural factors such as the speed, front/rear acceleration, the lateral acceleration, a route change rate, and the obstacle. This embodiment is characterized by defining, as one of such plural types of the route cost, the route cost according to the position of the vehicle 1 on the travel road 5 (more specifically, the positions of the sampling points SP on the travel route candidate RC) such that the vehicle 1 travels at a center position of a host vehicle lane in the travel road 5 (a travel lane where the host vehicle 1 travels on the travel road 5). A specific description will hereinafter be made on this route cost.

Figure 3:
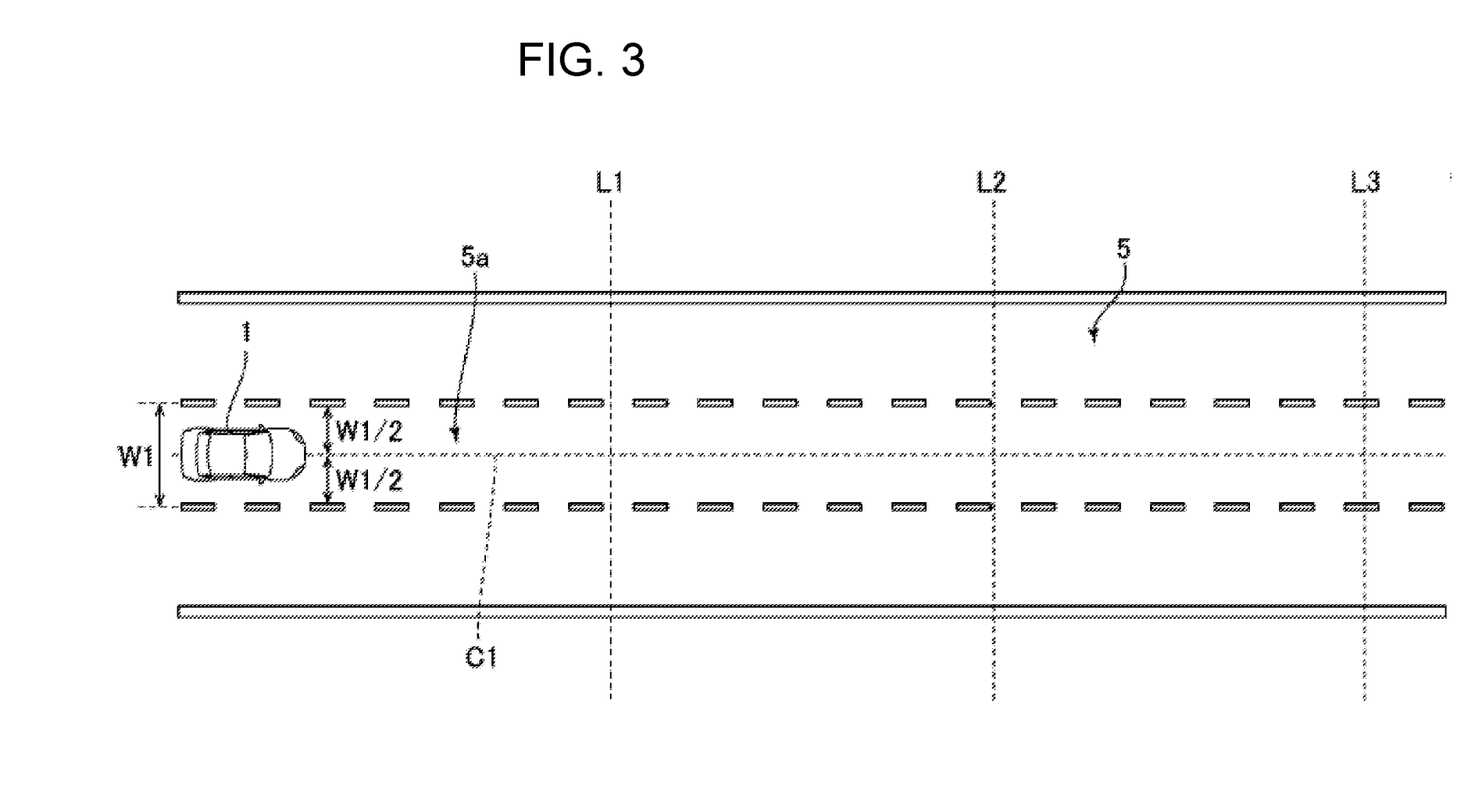
FIG. 3 is an explanatory view of a precondition for defining route cost according to the embodiment of the present disclosure.

A specific description will be made on the route cost according to the embodiment of the present disclosure with reference to FIGS. 3 and 4. First, FIG. 3 is an explanatory view of a precondition for defining the route cost according to the embodiment of the present disclosure. Similar to FIG. 2, FIG. 3 illustrates the situation where the vehicle 1 travels on the travel road 5.

In FIG. 3, the reference sign "5a" denotes the host vehicle lane on which the vehicle (the host vehicle) 1 travels in the travel road 5, the reference sign "C1" denotes a center line corresponding to a center position of the host vehicle lane 5a, and the reference sign "W1" denotes a width of the host vehicle lane 5a. When the width W1 of such a host vehicle lane 5a is used, a distance from the center line C1 to a side edge of the host vehicle lane 5a in the width direction is "W1/2". In the case where the travel road 5 is a one-lane road (a one-way road), the travel road 5 corresponds to the host vehicle lane 5a, and the above-described width W corresponds to the width W1.

In addition, in FIG. 3, the reference sign "L1" denotes a distance from the vehicle 1 along the travel road 5 for defining an area (a short-distance area) located relatively close (e.g., 20 to 40 feet) to the vehicle 1, the reference sign "L3" denotes a distance from the vehicle 1 along the travel road 5 for defining an area (a long-distance area) located relatively far away (e.g., 100 to 200 feet) from the vehicle 1, and the reference sign "L2" denotes a distance from the vehicle 1 along the travel road 5 for defining an area (a middle-distance area) between such a short-distance area and such a long-distance area. An area, a distance of which from the vehicle 1 is shorter than L1, is the short-distance area, an area, a distance of which from the vehicle 1 is equal to or longer than L1 and is shorter than L2, is the middle-distance area, and an area, a distance of which is equal to or longer than L2 and is shorter than L3, is the long-distance area (an area, a distance of which from the vehicle 1 is equal to or longer than L3 may also be included in the long-distance area).

More specifically, the short-distance area, the middle-distance area, and the long-distance area, just as described, are defined according to accuracy of the travel road information acquisition device (typically, accuracy of the camera 21). That is, the short-distance area is an area where the accuracy of the travel road information acquisition device is sufficiently secured, the middle-distance area is an area where the accuracy of the travel road information acquisition device starts being degraded, and the long-distance area is an area where it is difficult to secure the accuracy of the travel road information acquisition device. For example, on the basis of the accuracy of the camera 21 (in an example, the accuracy of the camera 21 is degraded by approximately 10% at a distance of 50 m from the vehicle 1), the distances L1, L2, and L3 are respectively set to 10 m, 30 m, 50 m.

Figure 4:
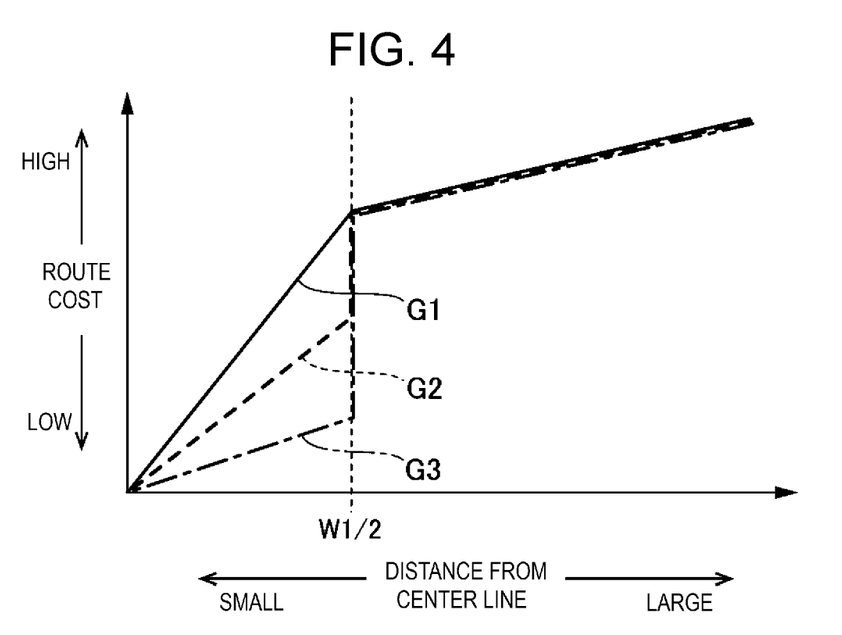
FIG. 4 is a map defining the route cost according to the embodiment of the present disclosure.

Next, FIG. 4 is a map defining the route cost according to the embodiment of the present disclosure. In FIG. 4, a horizontal axis represents a distance from the center line C1, more specifically, a distance between the sampling point SP and the center line C1 on the travel route candidate RC, and a vertical axis represents the route cost according to this distance from the center line C1 (the route cost to be set with respect to each of sampling points SP). In addition, a graph G1 indicated by a solid line represents a map that is applied in the short-distance area, a graph G2 indicated by a broken line represents a map that is applied in the middle-distance area, and a graph G3 indicated by a one-dot chain line represents a map that is applied in the long-distance area. The ECU 10 refers to the map as illustrated in FIG. 4 to determine the route cost at the sampling point SP, for which the route cost should be calculated, according to the distance between the sampling point SP and the center line C1.

In this embodiment, as shown in graphs G1 to G3, basically, as the distance between the center line C1 and the sampling point SP is reduced, the route cost at the sampling point SP is reduced, and as the distance between the center line C1 and the sampling point SP is increased, the route cost at the sampling point SP is increased. In this way, the travel route in which the vehicle 1 travels at the center position of the host vehicle lane 5a, that is, the travel route that realizes the lane centering can appropriately be set.

More specifically, in this embodiment, in the case where the distance between the center line C1 and the sampling point SP is shorter than the distance "W1/2" from the center line C1 to the end of the host vehicle lane 5a in the width direction, a change rate (a change amount, a degree of a gradient) of the route cost for the distance between the center line C1 and the sampling point SP is changed among the short-distance area, the middle-distance area, and the long-distance area. That is, in the case where the sampling point SP is located within the host vehicle lane 5a, the change rate of the route cost is increased in the short-distance area to be higher than the change rates in the middle-distance area and the long-distance area (a gradient of the graph G1 is increased to be larger than gradients of the graphs G2, G3), and the change rate of the route cost in the long-distance area is reduced to be lower than the change rates in the short-distance area and the middle-distance area (the gradient of the graph G3 is reduced to be smaller than the gradients of the graphs G1, G2). In other words, as the sampling point SP approaches the vehicle 1, the change rate of the route cost with respect to the distance from the center line C1 is increased, and as the sampling point SP separates from the vehicle 1, the change rate of the route cost with respect to the distance from the center line C1 is reduced.

In this way, in the short-distance area, the change rate of the route cost with respect to the distance from the center line C1 is high. Thus, the lane centering is preferentially considered when the travel route is set. That is, an influence of the route cost related to the lane centering on the route selection becomes significant. As a result, in the short-distance area, it is possible to appropriately select the travel route in which the lane centering is prioritized, and thus accuracy of the lane centering is improved.

Meanwhile, in the long-distance area, the change rate of the route cost with respect to the distance from the center line C1 is low. Thus, it is unlikely to preferentially consider the lane centering when the travel route is set. That is, the influence of the route cost related to the lane centering on the route selection becomes insignificant. In the long-distance area, it is difficult to secure the accuracy of the camera 21 or the like as described above. Thus, estimation accuracy of the shape and the like of the travel road 5 is degraded. Accordingly, in such a long-distance area, the change rate of the route cost with respect to the distance from the center line C1 is reduced. In this way, the prioritization of the lane centering is suppressed for the travel road 5, the estimation accuracy of the shape and the like of which is not secured.

In addition, in this embodiment, in the case where the distance between the center line C1 and the sampling point SP is shorter than the distance "W1/2", the change rate of the route cost for the distance between the center line C1 and the sampling point SP is increased to be higher than the change rate in the case where the distance between the center line C1 and the sampling point SP is equal to or longer than "W1/2". That is, in the case where the sampling point SP is located within the host vehicle lane 5a, the change rate of the route cost is increased to be higher than the change rate in the case where the sampling point SP is located on the outside of the host vehicle lane 5a. In this way, in the case where the sampling point SP is located within the host vehicle lane 5a, the influence of the route cost related to the lane centering on the route selection is increased. On the other hand, in the case where the sampling point SP is located on the outside of the host vehicle lane 5a, the influence of the route cost related to the lane centering on the route selection is reduced.

Furthermore, in this embodiment, unlike the case where the sampling point SP is located within the host vehicle lane 5a, in the case where the sampling point SP is located on the outside of the host vehicle lane 5a, the change rate of the route cost with respect to the distance from the center line C1 is set to be the same among the short-distance area, the middle-distance area, and the long-distance area (the gradients of the graphs G1, G2, and G3 are set to be the same). Also, in this case, the influence of the route cost related to the lane centering on the route selection is reduced in the case where the sampling point SP is located on the outside of the host vehicle lane 5a.

[Driving Assistance Processing]

Figure 5:
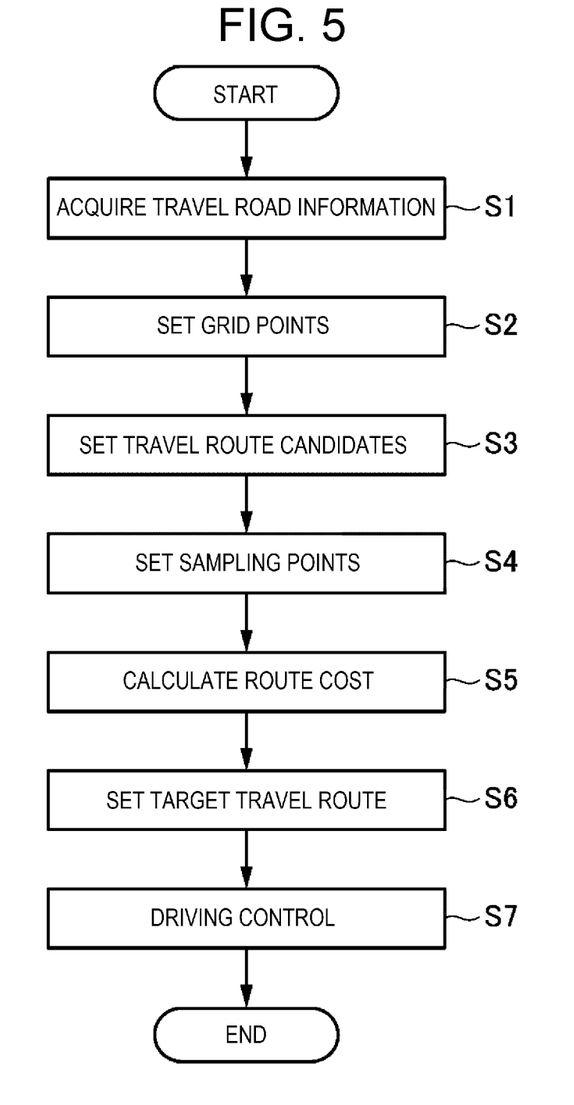
FIG. 5 is a flowchart of driving assistance processing according to the embodiment of the present disclosure.

Next, FIG. 5 is a flowchart of driving assistance processing according to the embodiment of the present disclosure. This processing is repeatedly executed in specified cycles (for example, every 0.05 to 0.2 seconds) by the ECU 10.

First, in step S1, the ECU 10 acquires the travel road information from the camera 21, the radar 22, and the navigation system 30. Alternatively, or complimentarily, the travel road information may be obtained from other sources as well, such as Lidar, and from radio frequency (RF) communication messages received by a RF receiver and the RF messages sent from external devices such as other cars, which have other sensors, as well as beacons, which are local devices that transmit absolute position data of SPs on the travel road in that particular location.

Next, in step S2, the ECU 10 identifies the shape of the travel road 5 (for example, the extending direction of the travel road 5, the width of the travel road 5, and the like) on the basis of the travel road information, and sets the plural grid points $G_n$ (n=1, 2, . . . N) on the travel road 5. For example, the ECU 10 sets the grid point $G_n$ for every 10 m in the x-direction and at every 0.875 m in the y-direction.

Next, in step S3, the ECU 10 sets the plural travel route candidates RC by the route search using the state lattice method on the basis of the travel road information. More specifically, the ECU 10 sets the plural travel route candidates RC in the manner to be branched from the position of the vehicle 1 toward the grid points $G_n$ existing in the advancing direction of the vehicle 1. The ECU 10 may set the travel route candidates RC on the basis of the obstacle information in addition to the travel road information. Moreover, lattice-based graphs are constructed by applying a set of motion primitives to each state expanded during the search in order to generate valid successor states. By doing this, they generate edges in the search graph between the (possibly non-adjacent) discretized states which serve as the graph nodes. A graph search algorithm, such as A* act on this lattice to generate a trajectory as a sequence of motion primitives between the start and goal state. As a type of graph, a state lattice has a set of states, S, connected by edges, E. To construct the set of states, S, each dimension is discretized into cells of finite size. Typically, metric dimensions are divided into small grids, for example, 0.1 m square regions, or as angular dimensions, e.g. {0°, 45°, . . . , 315°}. Larger cells, and therefore fewer states, improvs planning speed, while smaller cells can more accurately represent the environment but require more processing power. State lattices for vehicle movement also may include curvature, velocity, or other state variables as well. An example set is (x, y, yaw, vel). Edges of the state lattice are constructed by applying a set of pre-computed motion primitives to each state $s \in S$ and then adding a directed edge from s to the state $s' \in S$ at which the motion primitive ends. The motion primitives can be generated in a number of different ways. Example motion primitives are optionally generated off-line and stored as a library or via a control signal applied for a short time, where the trajectory resulting from this control input is the motion primitive. In an exemplary embodiment, motion primitives for stored in advance for left and right hand lane changes.

Next, in step S4, the ECU 10 sets the plural sampling points SP along each of the travel route candidates RC. For example, on each route of the travel route candidates RC, the ECU 10 sets the sampling points SP at equally-spaced intervals (every 0.2 m in an example) in the x-direction.

Next, in step S5, the ECU 10 calculates the route cost of each of the plural travel route candidates RC. More specifically, for each of the plural travel route candidates RC, the ECU 10 calculates the route cost at each of the plural sampling points SP. Then, the ECU 10 calculates the route cost, which is applied to the travel route candidate RC, from the plural types of the route cost that are calculated at the plural sampling points SP in the single travel route candidate RC. For example, the ECU 10 sets an average value of the plural types of the route cost at the plural sampling points SP as the route cost of the single travel route candidate RC. In this way, the ECU 10 calculates the route cost of all of the plural travel route candidates RC.

More specifically, when calculating the route cost at each of the sampling points SP, in addition to the route cost that is defined according to the distance from the above-described center line C1, the ECU 10 calculates the plural types of the route cost, such as the route cost that is defined according to the speed, the route cost that is defined according to the front/rear acceleration, the route cost that is defined according to the lateral acceleration, the route cost that is defined according to the route change rate, and the route cost that is defined according to the obstacle. Then, the ECU 10 calculates the route cost, which is finally applied at each of the sampling points SP, by weighing each of the thus-acquired plural types of the route cost, for example.

In particular, in this embodiment, in the case where the ECU 10 calculates the route cost that is defined according to the distance from the center line C1, the ECU 10 refers to the map illustrated in FIG. 4 to calculate the route cost. In detail, in regard to the sampling point SP as a calculation target of the route cost, the ECU 10 calculates the route cost according to the distance between the center line C1 and the sampling point SP on the basis of the area where the sampling point SP belongs (one of the short-distance area, the middle-distance area, and the long-distance area). That is, the ECU 10 uses the graph that corresponds to the area where the sampling point SP belongs (one of the graphs G1, G2, and G3 in FIG. 4), so as to calculate the route cost according to the distance from the center line C1. Note that the slope of the lines for G1, G2 and G3 are different, which G1 being the largest. The higher route cost associated with G1 per unit distance accounts for a user experience. Moreover, at slower speeds when pulling the vehicle back to the center of the lane, a user may feel like they are being whipsawed if the vehicle lateral acceleration is too pronounced. Thus, the cost at slower speeds is higher for unit distance. On the other hand, at faster speeds, the amount of lateral acceleration is more minor because a lesser amount of acceleration is needed at the high speed to reorient the vehicle to the center part of the lane.

In this case, the ECU 10 determines the area where the sampling point SP belongs on the basis of the x coordinate of the sampling point SP. More specifically, in the case where the x coordinate is shorter than the distance L1, the ECU 10 determines the area where the sampling point SP belongs as the short-distance area. In the case where the x coordinate is equal to or longer than L1 and is shorter than L2, the ECU 10 determines the area where the sampling point SP belongs as the middle-distance area. In the case where the x coordinate is equal to or longer than L2 and is shorter than L3, the ECU 10 determines the area where the sampling point SP belongs as the long-distance area. In addition, the ECU 10 calculates the distance between the center line C1 and the sampling point SP on the basis of the y coordinate of the sampling point SP. More specifically, the y coordinate is defined by the position of the vehicle 1 in the width direction of the travel road 5, that is, a position of a y-axis. Accordingly, the ECU 10 adds or subtracts a distance between this y-axis and the center line C1 to or from the y coordinate of the sampling point SP, so as to calculate the distance between the center line C1 and the sampling point SP. Here, the ECU 10 calculates the position of the center line C1 in the host vehicle lane 5a on the basis of the image data of the camera 21 included in the travel road information. More specifically, the ECU 10 identifies the host vehicle lane 5a on the basis of the road marking line (the lane divider, the white line, or the yellow line) and the like included in the image data, and calculates the position of the center line C1 from the center position in this identified host vehicle lane 5a in the width direction.

Next, in step S6, the ECU 10 sets the target travel route. More specifically, the ECU 10 selects the route with the minimum route cost from the plural travel route candidates RC on the basis of the route cost of each of the plural travel route candidates RC calculated as described above, and sets such a route as the target travel route.

Next, in step S7, the ECU 10 executes driving control (vehicle behavior control) including speed control and/or steering control of the vehicle 1 such that the vehicle 1 travels along the target travel route. More specifically, the ECU 10 sends the control signal to at least one of the engine control system 31, the brake control system 32, and the steering control system 33 and executes at least one of the engine control, braking control, and the steering control.

Figure 6:
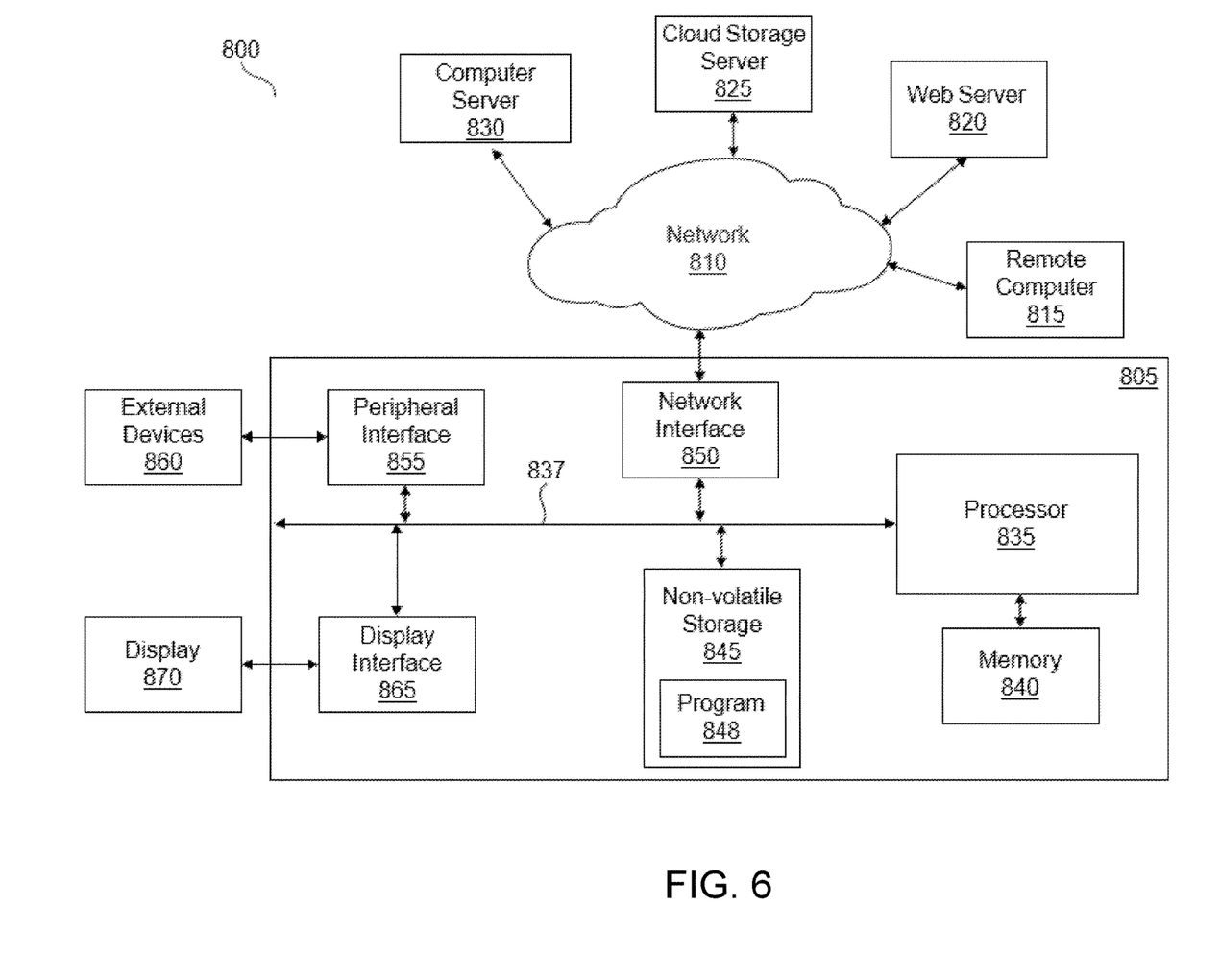
FIG. 6 is a block diagram of a computer-based system on which embodiments of the present system may be implemented.

FIG. 6 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure.

Referring to FIG. 6, a networked system 800 may include, but is not limited to, computer 805, network 810, remote computer 815, web server 820, cloud storage server 825 and computer server 830. In some embodiments, multiple instances of one or more of the functional blocks illustrated in FIG. 6 may be employed.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip GPUs, CPUs, or microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860. An example of an external device 860 is a radio frequency (RF) device that conveys RF messages of travel road data or obstacle data.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

[Operation and Effects]

Next, a description will be made on an operation and effects according to the embodiment of the present disclosure.

In this embodiment, in the vehicle driving assistance system 100, which sets the plural travel route candidates RC on the basis of the travel road information acquired from the camera 21 or the like, sets the plural sampling points SP on each of these plural travel route candidates RC, calculates the route cost at each of these plural sampling points SP, and sets the target travel route from the plural travel route candidates RC on the basis of this route cost, the ECU 10 increases the route cost at the sampling point SP as the distance between the center line C1 and the sampling point SP in the host vehicle lane 5a is increased. In particular, the ECU 10 increases the change rate of the route cost with respect to the distance between the center line C1 and the sampling point SP as the distance between the vehicle 1 and the sampling point SP is reduced.

In this way, in the short-distance area from the vehicle 1, the change rate of the route cost with respect to the distance from the center line C1 is high. Thus, the lane centering is preferentially considered when the travel route is set, that is, the influence of the route cost related to the lane centering on the route selection becomes significant. As a result, in the short-distance area, it is possible to appropriately select the travel route in which the lane centering is prioritized, and thus the accuracy of the lane centering is improved.

Meanwhile, in the long-distance area from the vehicle 1, the change rate of the route cost with respect to the distance from the center line C1 is low. Thus, it is unlikely to preferentially consider the lane centering when the travel route is set. That is, the influence of the route cost related to the lane centering on the route selection becomes insignificant. In the long-distance area, it is difficult to secure the accuracy of the camera 21 or the like. Thus, the estimation accuracy of the shape and the like of the travel road 5 is degraded. Accordingly, in such a long-distance area, the change rate of the route cost with respect to the distance from the center line C1 is reduced. In this way, the prioritization of the lane centering can appropriately be suppressed for the travel road 5, the estimation accuracy of the shape and the like of which is not secured.

In addition, in this embodiment, in the case where the sampling point SP is located within the host vehicle lane 5a, the ECU 10 increases the change rate of the route cost with respect to the distance between the center line C1 and the sampling point SP to be higher than the change rate in the case where the sampling point SP is located on the outside of the host vehicle lane 5a. In this way, in the case where the sampling point SP is located within the host vehicle lane 5a, the influence of the route cost related to the lane centering on the route selection can appropriately be increased. On the other hand, in the case where the sampling point SP is located on the outside of the host vehicle lane 5a, the influence of the route cost related to the lane centering on the route selection can appropriately be reduced.

In addition, in this embodiment, in the case where the sampling point SP is located on the outside of the host vehicle lane 5a, the ECU 10 sets the same change rate of the route cost with respect to the distance from the center line C1 regardless of the distance between the vehicle 1 and the sampling point SP unlike the case where the sampling point SP is located within the host vehicle lane 5a. Also, in this case, the influence of the route cost related to the lane centering on the route selection can appropriately be reduced in the case where the sampling point SP is located on the outside of the host vehicle lane 5a.

Furthermore, in this embodiment, the ECU 10 changes the change rate of the route cost with respect to the distance between the center line C1 and the sampling point SP stepwise according to the distance between the vehicle 1 and the sampling point SP. As a result, the several change rates of the route cost according to the distance between the vehicle 1 and the sampling point SP are stored. Thus, the change rate of the route cost, which should be applied according to the distance between the vehicle 1 and the sampling point SP, does not have to be calculated. Therefore, it is possible to reduce a calculation load for calculating the route cost.

MODIFIED EXAMPLES

In the above-described embodiment, the change rate of the route cost with respect to the distance between the center line C1 and the sampling point SP is changed stepwise according to the distance between the vehicle 1 and the sampling point SP. In another example, the change rate of the route cost with respect to the distance between the center line C1 and the sampling point SP may continuously be changed according to the distance between the vehicle 1 and the sampling point SP. In this way, it is possible to apply the change rate of the route cost, for which the distance between the vehicle 1 and the sampling point SP is accurately considered.

In the above-described embodiment, the vehicle 1 sets the route cost such that the travel route on which the vehicle 1 travels at the center position of the host vehicle lane 5a is set. In another example, the route cost may be defined such that the travel route on which the vehicle 1 travels at a position out of the center position of the host vehicle lane 5a is set. For example, the route cost may be defined such that the vehicle 1 travels on a travel route of so-called out-in-out when traveling at a corner.

In addition, in the above-described embodiment, an example in which the present disclosure is applied to the vehicle 1 having the engine as a drive source has been described (see FIG. 1). However, the present disclosure can also be applied to a vehicle having an electric motor as the drive source (an electric vehicle or a hybrid vehicle). Furthermore, in the above-described embodiment, the braking force is applied to the vehicle 1 by the brake system (the brake control system 32). However, in another example, the braking force may be applied to the vehicle by regeneration of the electric motor.

DESCRIPTION OF REFERENCE SIGNS AND NUMERALS

1: Vehicle
5: Travel road
5a: Host vehicle lane
10: ECU
21: Camera
22: Radar
30: Navigation System
100: Vehicle driving assistance system
800: Networked system
805: Computer
810: Network
815: Remote computer
820: Web Server
825: Cloud storage server
830: Computer server
835: Processor
837: Bus
840: Memory
845: Non-volatile storage 848: Program
850: Network interface (wireless)
855: Peripheral Interface
860: External devices
865: Display interface
870: Display
C1: Center line
$G_n$: Grid point
RC: Route candidate
SP: Sampling point

The invention claimed is:

1. A vehicle driving assistance system comprising:
a travel road information acquisition interface having peripheral interface circuitry that acquires travel road information about a travel road on which a vehicle is located, the interface configured to obtain the travel road information from any combination of a sensor, a set of sensors, and a remote source; and
a controller having circuitry configured to set a target travel route for the vehicle in the travel road based on the travel road information and to execute driving control of the vehicle so the vehicle travels along the target travel route, wherein
the circuitry is configured to:
set plural travel route candidates as candidate options for setting the target travel route based on the travel road information;
set plural sampling points on each of the plural travel route candidates;
calculate route cost at each of the plural sampling points set on each of the plural travel route candidates; and
select one travel route of the plural travel route candidates as the target travel route on the basis of having a lowest route cost, and
the circuitry is further configured to:
increase a route cost at a particular sampling point as a distance between a center line of a host vehicle lane, on which the vehicle travels, in the travel road and the particular sampling point is increased, and
increase a change rate of the route cost with respect to the distance between the center line and the particular sampling point as a distance between the vehicle and the particular sampling point along the travel road is reduced.

2. The vehicle driving assistance system according to claim 1, wherein
under a condition that the particular sampling point being located within the host vehicle lane, the circuitry is configured to increase the change rate of the route cost with respect to the distance between the center line and the particular sampling point to be higher than for a case where the particular sampling point is located outside of the host vehicle lane.

3. The vehicle driving assistance system according to claim 1, wherein
the circuitry is further configured to:
increase the change rate of the route cost with respect to the distance between the center line and the particular sampling point as the distance between the vehicle and the particular sampling point along the travel road is reduced under a condition where the particular sampling point is located within the host vehicle lane; and
set the same change rate of the route cost with respect to the distance between the center line and the particular sampling point regardless of the distance between the vehicle and the particular sampling point along the travel road under a condition where the sampling point is located on an outside of the host vehicle lane.

4. The vehicle driving assistance system according to claim 1, wherein
the circuitry is further configured to change the change rate of the route cost with respect to the distance between the center line and the sampling point stepwise according to the distance between the vehicle and the particular sampling point along the travel road.

5. The vehicle driving assistance system according to claim 1, wherein
the travel road information acquisition interface includes the set of sensors, the set of sensors including at least one of a camera, a radar, and a Lidar.

6. The vehicle driving assistance system according to claim 1, wherein
the travel road information acquisition interface includes a RF receiver that receives the travel road information from the remote source via RF communications.

7. The vehicle driving assistance system according to claim 1, further comprising:
an accelerometer that detects an acceleration experience by a passenger compartment of the vehicle, wherein
the circuitry is configured to calculate a cost of acceleration experience that is a factor in the one travel route selected by the circuitry as having the lowest route cost.

8. A vehicle driving assistance method executed by a controller including a computer, the vehicle driving assistance method comprising:
setting, with circuitry, plural travel route candidates as candidate options for setting a target travel route for a vehicle located on a travel road based on travel road information on the travel road;
setting plural sampling points on each of the plural travel route candidates;
calculating, with the circuitry, route cost at each of the plural sampling points set on each of the plural travel route candidates;
selecting one travel route of the plural travel route candidates as the target travel route on the basis of having a lowest route cost; and
executing driving control of the vehicle so the vehicle travels along the target travel route, wherein
the calculating the route cost, includes
increasing a route cost at a particular sampling point as a distance between a center line of a host vehicle lane, on which the vehicle travels, in the travel road and the particular sampling point is increased, and
increasing a change rate of the route cost with respect to the distance between the center line and the particular sampling point as a distance between the vehicle and the particular sampling point along the travel road is reduced.

9. The vehicle driving assistance method of claim 8, further comprising:
obtaining the travel road information via any combination of a sensor, a set of sensors, and a remote source.

10. The vehicle driving assistance method of claim 9, wherein the obtaining includes obtaining at least a portion of the travel road information via at least one of a camera, a radar, and a Lidar.

11. The vehicle driving assistance method of claim 9, wherein
the obtaining includes obtaining the travel road information via RF communication with a remote source that is external to the vehicle.

12. The vehicle driving assistance method of claim 8, further comprising detecting with an accelerometer passenger compartment acceleration, wherein    the calculating the route cost includes calculating a cost of passenger compartment acceleration as a factor in selecting the one travel route.

13. The vehicle driving assistance method of claim 8, further comprising:

under a condition that the particular sampling point being located within the host vehicle lane, increasing the change rate of the route cost with respect to the distance between the center line and the particular sampling point to be higher than for a case where the particular sampling point is located outside of the host vehicle lane.

14. The vehicle driving assistance method of claim 8, further comprising:

increasing the change rate of the route cost with respect to the distance between the center line and the particular sampling point as the distance between the vehicle and the particular sampling point along the travel road is reduced under a condition where the particular sampling point is located within the host vehicle lane; and    setting the same change rate of the route cost with respect to the distance between the center line and the particular sampling point regardless of the distance between the vehicle and the particular sampling point along the travel road under a condition where the sampling point is located on an outside of the host vehicle lane.

15. The vehicle driving assistance method of claim 8, further comprising:

changing the change rate of the route cost with respect to the distance between the center line and the sampling point stepwise according to the distance between the vehicle and the particular sampling point along the travel road.

16. A non-transitory computer readable storage device having computer readable instructions that when executed by a controller including a computer cause the computer to execute a vehicle driving assistance method, the vehicle driving assistance method comprising:

setting plural travel route candidates as candidate options for setting a target travel route for a vehicle located on a travel road based on travel road information on the travel road;

setting plural sampling points on each of the plural travel route candidates;

calculating route cost at each of the plural sampling points set on each of the plural travel route candidates;

selecting one travel route of the plural travel route candidates as the target travel route on the basis of having a lowest route cost; and    executing driving control of the vehicle so the vehicle travels along the target travel route, wherein    the calculating the cute cost, includes    increasing a route cost at a particular sampling point as a distance between a center line of a host vehicle lane, on which the vehicle travels, in the travel road and the particular sampling point is increased, and    increasing a change rate of the route cost with respect to the distance between the center line and the particular sampling point as a distance between the vehicle and the particular sampling point along the travel road is reduced.

17. The non-transitory computer readable storage device according to claim 16, wherein the method further comprises:

detecting with an accelerometer passenger compartment acceleration, wherein    the calculating the route cost includes calculating a cost of passenger compartment acceleration as a factor in selecting the one travel route.

18. The non-transitory computer readable storage device according to claim 16, wherein the method further comprises:

under a condition that the particular sampling point being located within the host vehicle lane, increasing the change rate of the route cost with respect to the distance between the center line and the particular sampling point to be higher than for a case where the particular sampling point is located outside of the host vehicle lane.

19. The non-transitory computer readable storage device according to claim 16, wherein the method further comprises:

increasing the change rate of the route cost with respect to the distance between the center line and the particular sampling point as the distance between the vehicle and the particular sampling point along the travel road is reduced under a condition where the particular sampling point is located within the host vehicle lane; and    setting the same change rate of the route cost with respect to the distance between the center line and the particular sampling point regardless of the distance between the vehicle and the particular sampling point along the travel road under a condition where the sampling point is located on an outside of the host vehicle lane.

20. The non-transitory computer readable storage device according to claim 16, wherein the method further comprises:

changing the change rate of the route cost with respect to the distance between the center line and the sampling point stepwise according to the distance between the vehicle and the particular sampling point along the travel road.

\* \* \* \* \*